(12) United States Patent
Cronmiller

(10) Patent No.: US 11,050,488 B1
(45) Date of Patent: Jun. 29, 2021

(54) SYSTEM AND METHOD FOR VISIBLE LIGHT COMMUNICATION WITH A WARNING DEVICE

(71) Applicant: STAR HEADLIGHT & LANTERN CO., INC., Avon, NY (US)

(72) Inventor: James J. Cronmiller, Penfield, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 0 days.

(21) Appl. No.: 16/593,763

(22) Filed: Oct. 4, 2019

Related U.S. Application Data

(60) Provisional application No. 62/742,076, filed on Oct. 5, 2018.

(51) Int. Cl.
| | |
|---|---|
| *H04B 10/116* | (2013.01) |
| *G08B 7/06* | (2006.01) |
| *H04L 1/00* | (2006.01) |
| *H04L 7/00* | (2006.01) |
| *G06F 3/0482* | (2013.01) |

(52) U.S. Cl.
CPC ............ *H04B 10/116* (2013.01); *G08B 7/06* (2013.01); *H04L 1/0061* (2013.01); *H04L 7/0075* (2013.01); *G06F 3/0482* (2013.01)

(58) Field of Classification Search
None
See application file for complete search history.

(56) References Cited

U.S. PATENT DOCUMENTS

| | | |
|---|---|---|
| 8,669,852 B2 | 3/2014 | Neufeglise et al. |
| 8,941,487 B2 | 1/2015 | Lee et al. |
| 8,963,705 B2 | 2/2015 | Miller et al. |
| 9,060,409 B2 | 6/2015 | Bowers et al. |
| D796,367 S | 9/2017 | Neufeglise et al. |
| 9,853,740 B1 | 12/2017 | Bortz et al. |

(Continued)

OTHER PUBLICATIONS

Varanva, Devendra J., et al., LED to LED communication with WDM concept for flash light of Mobile phones Visible Light Communication, International Journal of Advanced Computer Science and Applications, vol. 4, No. 7, pp. 28-31, 2013.

(Continued)

*Primary Examiner* — David W Lambert
(74) *Attorney, Agent, or Firm* — Kenneth J. LuKacher; Kenneth J. LuKacher Law Group

(57) ABSTRACT

A system for visible light communication having a portable device with a visible light source operated to emit optical signals as light pulses representative of data, and a warning device having one or more sources providing one or more of visible and/or audible warning signals. The warning device has a controller which detects the data using electrical signals received from a light sensor representative of the light pulses. Responsive to at least a portion of the detected data, the controller operates one or more sources of the warning device. The detected data includes one or more programming options, such as patterns, for operating the one or more sources of the warning device. The portable device may be a smartphone or tablet having a built-in flash providing the visible light source, where programming options are selectable via a user interface along the portable device.

26 Claims, 11 Drawing Sheets

(56) References Cited

U.S. PATENT DOCUMENTS

| | | |
|---|---|---|
| 2002/0127019 A1 | 9/2002 | Ogasawara |
| 2006/0239689 A1* | 10/2006 | Ashdown ........... H04B 10/1141 |
| | | 398/130 |
| 2007/0242338 A1* | 10/2007 | Bradley ............... B60Q 1/0017 |
| | | 359/237 |
| 2011/0153121 A1 | 6/2011 | Minassian |
| 2013/0010018 A1* | 1/2013 | Economy ............... H05B 47/19 |
| | | 345/691 |
| 2013/0183042 A1 | 7/2013 | Knapp et al. |
| 2016/0373909 A1 | 12/2016 | Rasmussen et al. |
| 2017/0124861 A1* | 5/2017 | Cash ................. H04M 1/72533 |
| 2017/0180048 A1 | 6/2017 | Liu et al. |
| 2017/0187457 A1 | 6/2017 | Liu et al. |
| 2017/0264364 A1 | 9/2017 | Aoyama et al. |

OTHER PUBLICATIONS

Boubezari, R., et al., Smartphone Camera Based Visible Light Communication, Journal of Lightwave Technology, vol. 34, No. 17, pp. 4121-4127, 2016.

Star Headlight & Lantern Co., 66 Series Star Alarm®, 66 Series Star Spectrum Alarm, Mar. 5, 2018.

Star Headlight & Lantern Co., Versa Star® LED Lights, Feb. 19, 2016.

* cited by examiner

Example 1

| start bit 1 | $S_L$ | $S_H$ | P | data set start | $S_L$ | $S_H$ | P | Pattern E1 | $S_L$ | $S_H$ | P | Pattern E2 | $S_L$ | $S_H$ | P | Pattern E3 | CRC | $E_B$ |
|---|---|---|---|---|---|---|---|---|---|---|---|---|---|---|---|---|---|---|
| 1 1 1 1 | 0 | 0 | 0 | 00000000 | 0 | 1 | 1 | 00000001 | 0 | 1 | 1 | 00000111 | 0 | 1 | 0 | 00000101 | 00001101 | 1 |

⎵ null start frame

Example 2

| start bit 1 | $S_L$ | $S_H$ | P | data set start | $S_L$ | $S_H$ | P | Pattern E1 | $S_L$ | $S_H$ | P | Pattern E2 | $S_L$ | $S_H$ | P | Pattern E3 | CRC | $E_B$ |
|---|---|---|---|---|---|---|---|---|---|---|---|---|---|---|---|---|---|---|
| 1 1 1 1 | 0 | 0 | 0 | 00000000 | 0 | 1 | 0 | 00000000 | 0 | 1 | 0 | 00001001 | 0 | 1 | 0 | 00010010 | 00011011 | 1 |

⎵ null start frame

FIG. 7 though in other embodiments different text may be used. The background of each button may change responsive to it being selected, such as being lighter (or darker) than when such button is not selected.

SYSTEM AND METHOD FOR VISIBLE LIGHT COMMUNICATION WITH A WARNING DEVICE

This application claims priority to U.S. Provisional Patent Application No. 62/742,076, filed Oct. 5, 2018, which is incorporated herein by reference.

FIELD OF THE INVENTION

The present invention relates to a system and method for visible light communication with a warning device, and particularly, to a system and method using a light emitter of a portable device, such as smartphone or tablet, to provide visible light pulses representative of data to the warning device, where such warning device responsive to such data operates one or more sources providing one or more of visible or audible warning signals from the warning device.

BACKGROUND OF THE INVENTION

Emergency warning lights and audible warning alarms often have options to select different warning signals, such as different visible or audible patterns, that are traditionally set by repeated button pushes or toggling wires to power or ground to program their pattern of operation. While wireless communication via protocols, such as Bluetooth or Wi-Fi, have been incorporated in many devices, such as coffee makers, televisions, alarm clocks, refrigerators, and the like, it has been found that adding wireless communication electronics for Bluetooth and/or Wi-Fi into emergency warning devices undesirably increases manufacturing cost, and moreover use chips taking up more area than desired on the warning device's circuit board. Thus, it would be desirable to provide wireless communication with emergency warning devices to program their operation, such as by using smartphones or tablets, without requiring the warning lights to contain Bluetooth or Wi-Fi technology.

SUMMARY OF THE INVENTION

Accordingly, an object of the present invention is to provide a system and method for visible light communication with a warning device using optical signals provided by visible light pulses from a portable device.

It is a further object to provide a system and method for visible light communication with a warning device using optical signals provided by visible light pulses from a portable device to facilitate wireless programming of the warning device.

Briefly described, the present invention embodies a system having a portable device with a visible light source operated to emit optical signals as light pulses representative of data, and a warning device having one or more sources providing one or more of visible or audible warning signals. The warning device has a controller, and a light sensor providing electrical signals to the controller representative of the light pulses sensed by the light sensor. The controller detects the data using the electrical signals received from the light sensor, and operates the one or more sources responsive to at least a portion of the data detected.

The portion of the data detected, which the controller operates responsive to, represents one or more programming options for operating the one or more sources of the warning device, such as the pattern of warning signals or other selectable operation parameters of warning device operation. The warning device may be one of a plurality of different warning devices each with same or different ones of such one or more programming options.

Preferably, only one-way communication from the portable device to the warning device is enabled by the light pulses emitted from the visible light source to the light sensor. Such light pulses being representative of data in the form of a stream of binary bits of high "1" or low "0" values, where each of the bits is associated with presence or absence, respectively, of a light pulse detected by the controller using analog electrical signals received from the light sensor over an interval of time associated with each bit's width. To determine the value of each bit, the controller compares a measured or read voltage value of the electrical signal from the light sensor with a threshold level stored in memory of the controller. When the threshold level is exceeded, a high or binary "1" bit is received, and when at or below the threshold level a low or "0" bit is received.

The light pulses from the light source of the portable device may be considered as representing a first group and second group of light pulses, where the first group is emitted prior to the second group, and the second group has light pulses representative of the data that includes the programming option(s) for the one or more sources of the warning device. The first group of light pulses enables any decrease or increase in the threshold level if needed, until such first group of light pulses are detectable as high and low values by the controller using the light sensor, so that the threshold level will provide proper conversion of electrical signals from light sensor by the controller into digital binary bit values for use by the controller. This allows the controller to adjust for sensitivity of data detection by accounting for ambient light present (from artificial and/or natural sources), and the illumination power or output radiance of the visible light source of the portable device, upon the light sensor of the warning device when sensing light pulses from the light source. The second group of light pulses, in additional to those light pulses representative of the data representing one or more programming options, includes other light pulses representative of data for enabling the controller to parse for the portion of the data representing each programming option, and for synchronization of data detection and error detection by the controller.

The portable device may be a smartphone or tablet computer (referred to herein as a tablet) having the visible light source of the system as a part of the portable device. In this case, the light source is provided by a light emitter along the portable device's housing typically used as a flash with a camera software application on the portable device. The portable device is programmed with application software in its memory to provide a user interface enabling selection of the programming option(s) for the warning device, and to format the selected option(s) within data of a stream of binary bits converted by the portable device into outputted light pulses sent using its light emitter to enable visible light communication in the system, which may then be detected as binary bits by the warning device using its light sensor. In operation, the portable device is held by its user in close proximity to the warning device's light sensor, such as 6 inches or less, when sending optical signals in light pulses from the portable device's light emitter.

The warning device may be a visible warning device having one or more illumination sources, such as LEDs, providing visible warning signals from the warning device. Where multiple illumination sources are provided, each may provide a different color of light from the warning device, and the user interface of the portable device enables for each illumination source to select an option of one of multiples patterns, which may include steady on, and off. In the case where all of the one or more illumination sources provide light of the same color, the user interface of the portable device enables at least selection of an option of one of such multiples patterns light to be provided from the one or more illumination sources.

The warning device may also be an audible warning device having an audible source of a speaker providing audible warning signals, and the user interface of the portable device enables at least selection of programming option(s) in terms of a pattern of sound or tone emitted from such speaker. The audible warning device may optionally further have illumination source(s), where the patterns of both illumination and audible sources are selectable options via the user interface of the portable device.

A method for visible light communication with a warning device is also provided by the present invention having the steps of: operating a visible light source of a portable device to emit optical signals as light pulses representative of data; detecting by a light sensor of a warning device data representative of the light pulses; and operating one or more sources of the warning device to provide one or more of visible or audible warning signals responsive to at least a portion of the data detected.

A visible or audible warning device is further provided by the present invention having one or more sources providing one or more of visible or audible warning signals, a controller, and a light sensor providing electrical signals to the controller representative of light pulses sensed by the light sensor, in which the controller detects data using the electrical signals received from the light sensor, and operates the one or more sources responsive to at least a portion of the data.

Still further, a portable device, such as a smartphone, tablet, or other programmable mobile device, is provided for wireless communication using a visible light source having a portable housing having a first surface with a display, and a user interface along the display for selecting one or more options for operation of one or more sources providing one or more of visible or audible warning signals from a warning device. A visible light source along a second surface opposing the first surface is operated to emit optical signals as light pulses representative of data in which at least a portion of the data represents such one or more options for use by the warning device in controlling the one or more sources.

BRIEF DESCRIPTION OF THE DRAWINGS

The foregoing and other objects, features, and advantages of the invention will become more apparent from a reading of the following description in connection with the accompanying drawings in which:

FIG. 7 are two examples of data in the form of a stream of binary bits which is converted by the portable device of FIG. 1 into light pulses emitted by the light source and detected by warning device of FIG. 1 using a light sensor in example of the warning device of FIGS. 2, 3, and 3A;

DETAILED DESCRIPTION OF THE INVENTION

Figure 1:
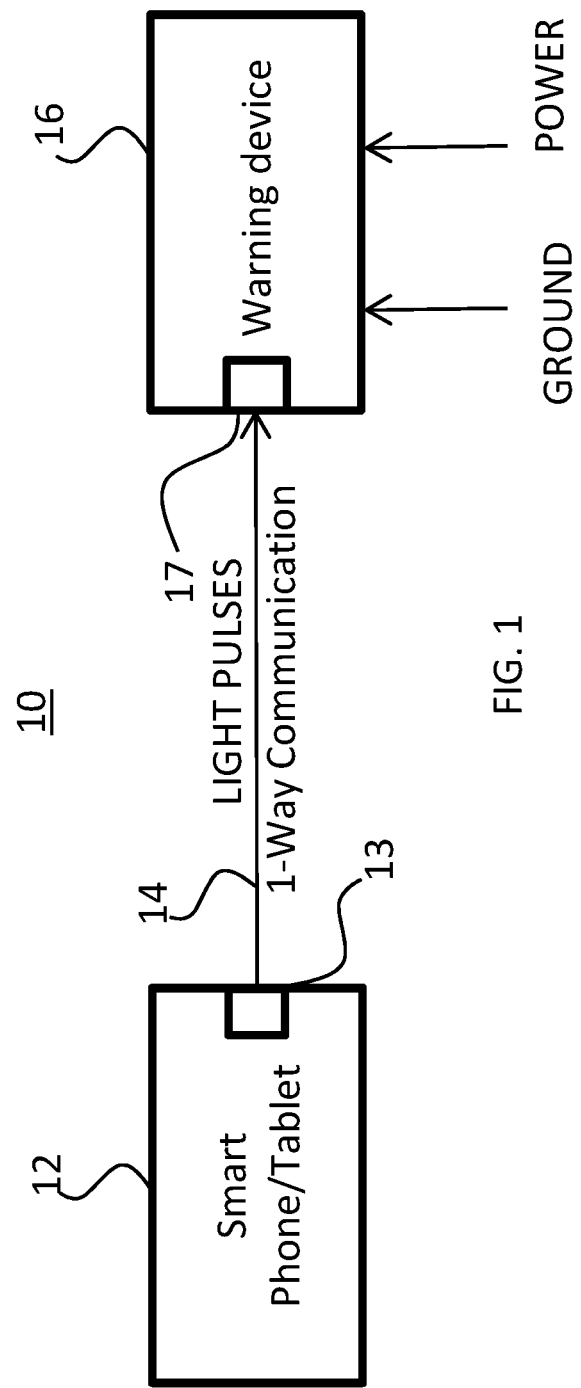
FIG. 1 is a block diagram of the system of the present invention showing a portable device with a visible light source in proximity of a warning device having a light sensor.

Referring to FIG. 1, a system 10 of the present invention is shown having a portable device 12 with a light source or emitter 13, such as one or more LEDs, providing visible light pulses 14 to a warning device 16 for sensing by a light sensor 17. The portable device 12 may be a smartphone or a tablet type device with light emitter 13 in the form of a built-in flash, typically an LED. The portable device 12 operates in accordance with a software application program stored in memory as described herein in enabling the portion of system 10 provided by the portable device 12. Such software application may be downloaded wirelessly over cellular or Wi-Fi interface of the portable device 12 as typical of a smartphone or tablet. While such light emitter 13 may be commonly used by such portable device as a flash for a camera software application or as a flashlight, it is utilized herein for the purposes of visible light communication of data to warning device 16. The portable device 12 is placed close to the light sensor 17 of the warning device 16 in order to enable transmission of data using optical signals as light pulses 14 from light emitter 13 in the visible spectrum as a transfer medium for wireless transmission from portable device 12 to warning device 16.

While portable device 12 is preferably a hand-held programmable device provided by a smartphone or a tablet type device with light emitter 13, portable device 12 may also be a laptop computer with light emitter 13, or a desktop computer with an integrated visible light emitter 13, or preferably a separate visible light emitter 13 of a module which is coupled by a cable to a USB port (or wirelessly) to the laptop or desktop computer providing power and control of the operation light emitter 13 in accordance with system 10. Such separate visible light emitter 13 has one or more LEDs providing visible light, and is considered a portable device locatable in proximity to warning device 16 in the same manner as a smartphone or tablet.

Warning device 16 may be a visual warning device providing visual warning signals or an audible warning device providing audible warning signals. In the case of warning device 16 being a visual warning device, warning device 16 has a housing with one or more illumination sources in the form of light(s) or lamp(s), such as LEDs or bulbs, and different selectable modes of operation in terms of flash illumination and flash rates. One of such modes can optionally include non-flashing on state (e.g., steady burn). Depending on the particular visual warning device, output illumination color may be monocolor or selectable between modes of different colors of output illumination. Typical colors of illumination, are red, white, amber, green, or blue. Visual warning devices capable of being programmed to provide light selectable among multiple different color modes (or patterns) have different color light sources. Further additional modes are optionally provided enabling each visual warning device to have high power and low power states for selectable day and night (or low ambient light) time operation, respectively. Such warning device 16 providing visual warning signals may be mounted on or in a vehicle to output visual warning signals therefrom, such as emergency or construction vehicles, or upon other structures.

Figure 9:
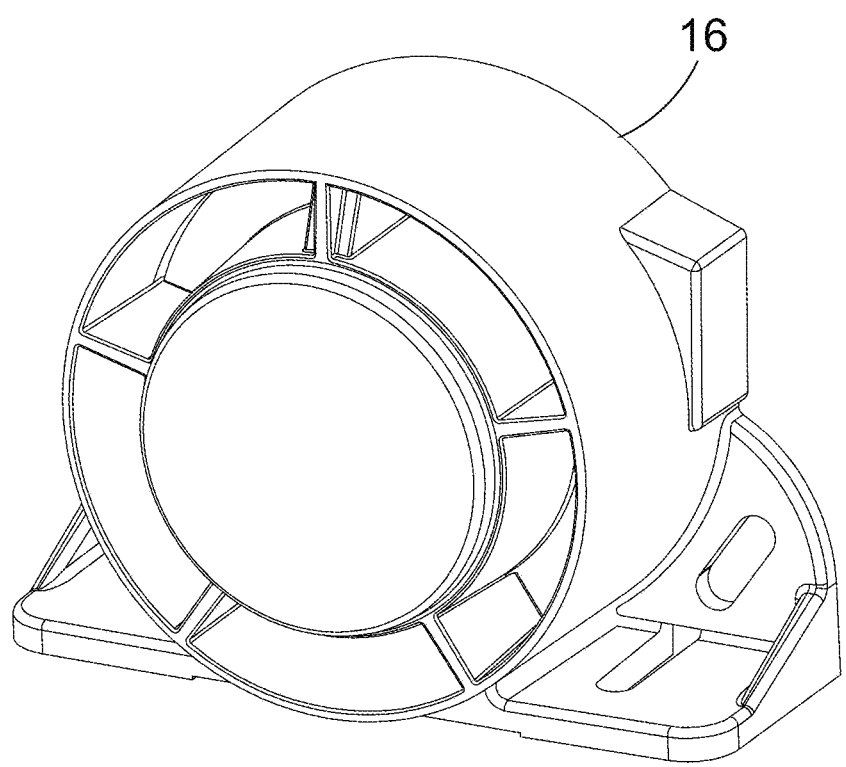
FIG. 9 is another example of a warning device of FIG. 1 of a backup alarm providing audible warning signals.

In the case of warning device 16 being an audible warning device, warning device 16 may be a siren that is mounted on a vehicle or other structure, or a backup alarm, such as shown in FIG. 9, which is mountable along the rear of a vehicle and activates to output audible warning signals therefrom when a vehicle is backing up or traveling in reverse gear. Such backup alarm has a housing with a speaker providing a sound alarm which has different selectable modes of operation in terms of tone frequency, pattern and/or rate. For purposes of illustration of system 10, the warning device 16 is described herein as a visible warning device 16 of FIG. 3A having three illumination sources 18a, 18b, and 18c as shown in FIGS. 2 and 3.

Figure 2:
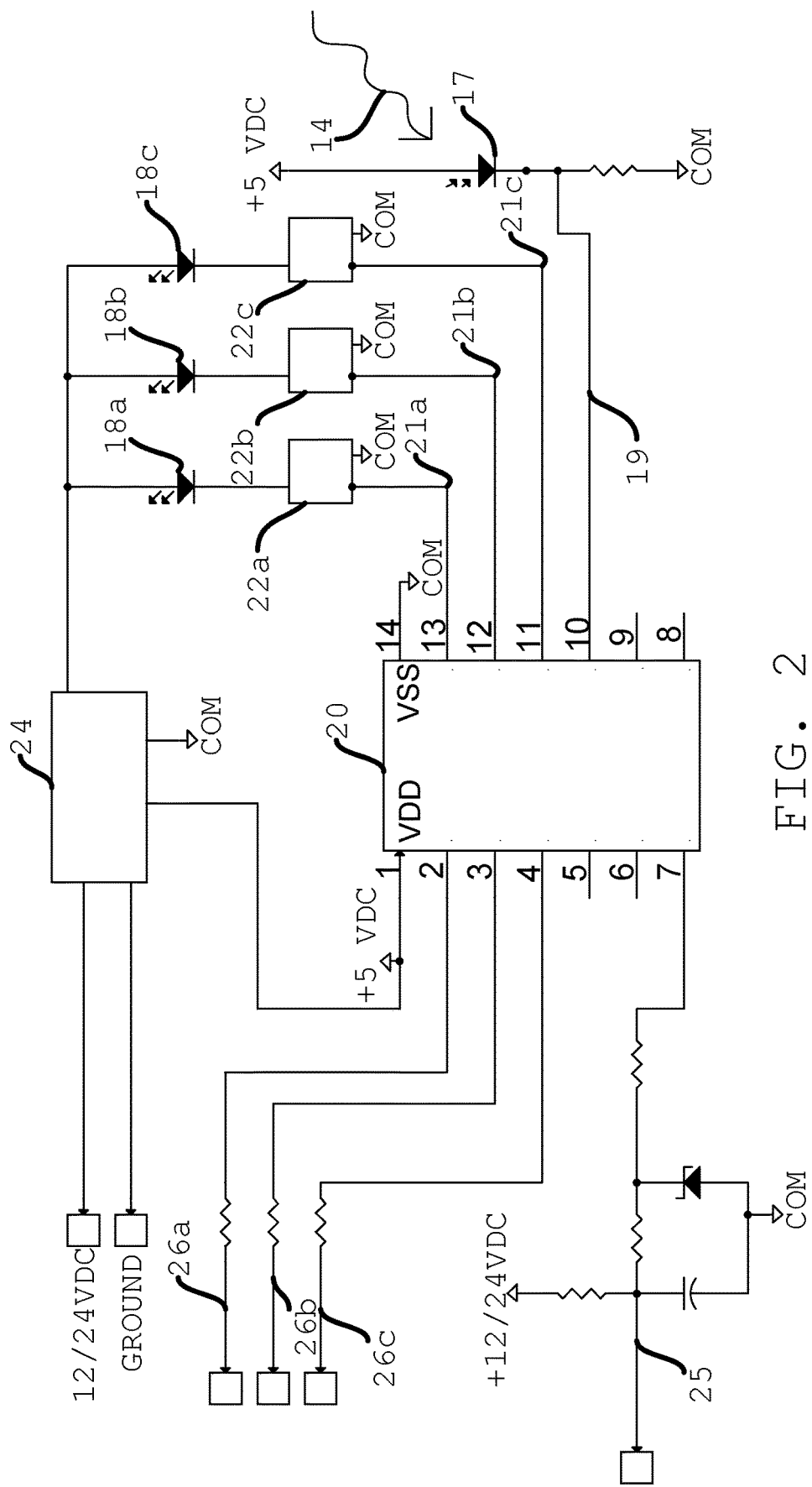
FIG. 2 is a schematic diagram of the electronics for an example of a warning device in the system of FIG. 1 which provides visible warning signals.
Figure 3:
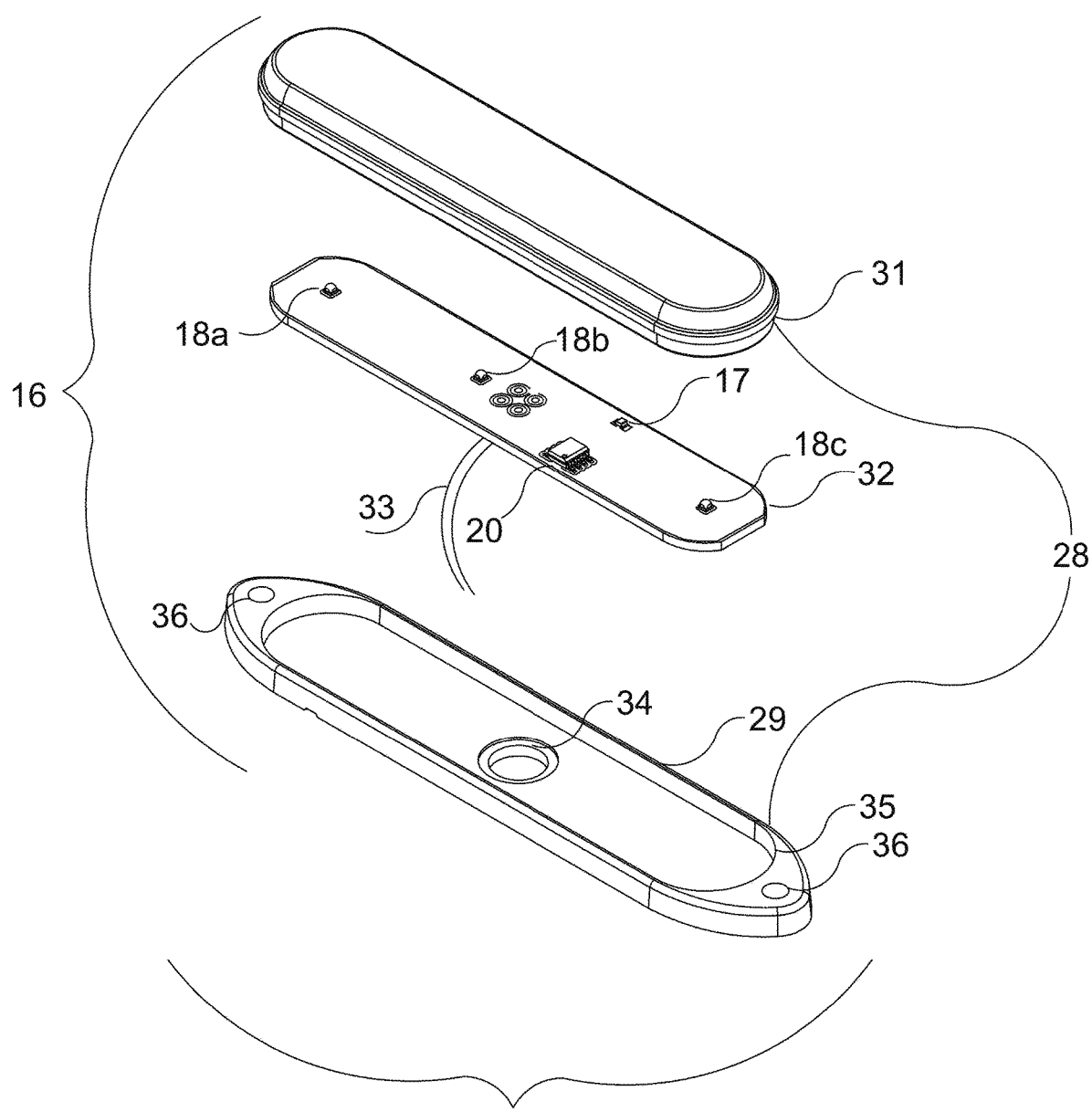
FIGS. 3 and 3A are exploded and assembled views, respectively, of an example of a warning device providing visual warning signals with the electronics of FIG. 2.

Referring to FIG. 2, a schematic of the electronics of the warning device 16 is shown for example visible warning device 16. A controller (microcontroller or microprocessor) 20 outputs signals along three enable lines 21a, 21b, and 21c to individually control current sources 22a, 22b, and 22c, respectively, of three circuits for driving LEDs 18a, 18b, and 18c, respectively. Each enable line 21a, 21b, 21c ("21a-c") when high (on) switches on drive current to their associated LED 18a, 18b, 18c ("18a-c"), and when low (off) disables drive current to such LED. The current sources 22a, 22b, and 22c may each be provided by a MOSFET operating responsive to its respective enable line 21a-c. The controller 20 operates in accordance with a program stored in its memory (ROM or RAM) to enable operation of warning device 16. For example, controller 20 may be a PIC microcontroller, but other programmable logic device may be used which can output enable signals to each of the circuits associated with LEDs 18a-c.

The LEDs 18a, 18b, and 18c each provide light of a different color, such as red, blue, and white when activated. In order to select the desired color(s) of operation of visual warning signals, enable lines 26a, 26b, and 26c ("26a-c") are provided to controller 20. Enable line 26a, 26b, and 26c are either connected to 12/24 VDC or ground to enable or disable, respectively, the controller 20 from sending signals along enable lines 21a, 21b, and 21c, respectively, to circuits driving the LEDs 18a, 18b, and 18c, respectively.

Adjustable voltage source 24 represents a voltage converter to supply power to operate controller 20 and the individual circuits driving LEDs 18a-c (in accordance with the particular manufacturer specifications of the LEDs) when enabled. A ground line and 12/24 VDC line are provided to adjustable voltage source 24. Voltage source 24 may externally receive 12 VDC or 24 VDC depending on the voltage source externally available.

Light sensor 17 is provided by a photo diode which senses light from light emitter 13 of portable device 12 and provides along input line 19 to controller 20 an analog electrical signal at or between 0 to 5V representing a level of visible light detected. For example light sensor 17 may be a Vishay Intertechnology, Inc., Model No. TEMT7000×01 photo sensor, but other photo sensor may be used. Light sensor 17 is sensitive to visible light radiation, but may optional be sensitive to particular wavelength(s) or wavelength range(s) within, or at least comprises a part of the visible light spectrum emitted by light emitter 13. To detect data represented by light pulses from light emitter 13 of portable device 12, controller 20 receives and measures the analog electrical signal's voltage along line 19 representative of the level or amount of light upon light sensor 17, and compares the measured voltage value to a threshold level stored in its memory. When the threshold level is exceeded, a high or binary "1" bit value is received, and when below the threshold level a low or binary "0" bit value is received, by controller 20. For example, such threshold level may be 120 millivolts, but other level may be used. As will be described in connection with FIGS. 5 and 6, the threshold level is adjustable to account for ambient illumination upon the light sensor 17 when high, such as sunlight, or to account for a low amount of illumination from light emitter 13 being sensed by light sensor 17. The sampling of the analog signal by controller 20 along line 19, and conversion into a digital binary bit value, is performed periodically based on a clock, such as every 20 milliseconds, where each detected bit is 40 milliseconds in length. In the stream of bits represented by light pulses 14, the presence or absence of light representative of each binary bit is thus each 40 milliseconds in length. A clock in the controller 20 is used to measure each of the intervals of sampling the analog signal along line 19. However, a different length bit or sampling frequency may be used.

After receiving and detecting a stream of bits of data representative of light pulses 14, controller 20 reads from the data the portion thereof that contains each of the programming options, e.g., a number associated with a pattern, for driving each of LEDs 18a-c, controller 20 stores the options in its memory and then drives enable lines 21a-c for each of the LEDs 18a-c (if enabled by its associated lines 26a-c) accordingly. A lookup table in memory of controller 20 may be provided associating unique numbers to different patterns with timing parameters, on and off intervals, for use by the controller 20 in driving enable lines 21a-c in accordance with the pattern associated with each of the read programming options. The interval (or rate) of flashing for each of the different selectable patterns are measured in accordance with the controller's clock. Thus, data obtained by controller 20 in the form of ones and zeros (on's and off s) is a result of light pulses 14 sent from portable device 12. Prior to the transmission of light pulses 14 to light sensor 17, one or more programming options for warning device 16 are selected by an installer or user on the portable device 12, such via user interface 38 of FIGS. 4 and 4A as will be described later.

Preferably, an input line or wire 25 to controller 20 is enabled by being tied to ground to allow the controller 20 to receive data using light sensor 17. If line 25 is not connected to ground, then line 25 is at 12/24 VDC, thereby disabling line 25 and preventing operation of the controller 20 responsive to received data using light sensor 17. As wireless communicated data using light pulses 14 is only accepted if the input line 25 is tied to ground, only the installer or user, or in case where the warning device 16 is one which is mounted to a vehicle frame, by a person with access to the inside of such frame, would be able to change options for warning device 16. This represents a preferred security measure to allow wireless programing of the warning device's selectable options responsive to light pulses 14 when desired. Optionally, a button is provided to input line 25 which when pressed grounds the line until released. Such button may be along the housing of the warning device 16, and held down or pressed as the same time light pulses 14 from portable device 12 are sent for reception by light sensor 17.

While a single illumination source is shown for each of LEDs 18*a-c* in FIG. 2, one or more additional LEDs may be provided in parallel in the drive circuit for each of the LEDs 18*a-c*. Optionally, only one LED 18*a*, or two of LED(s) 18*a* and 18*b* may be provided with their associated enable line(s) and current source(s) to provide mono or dual color operation, respectively.

Figure 3A:
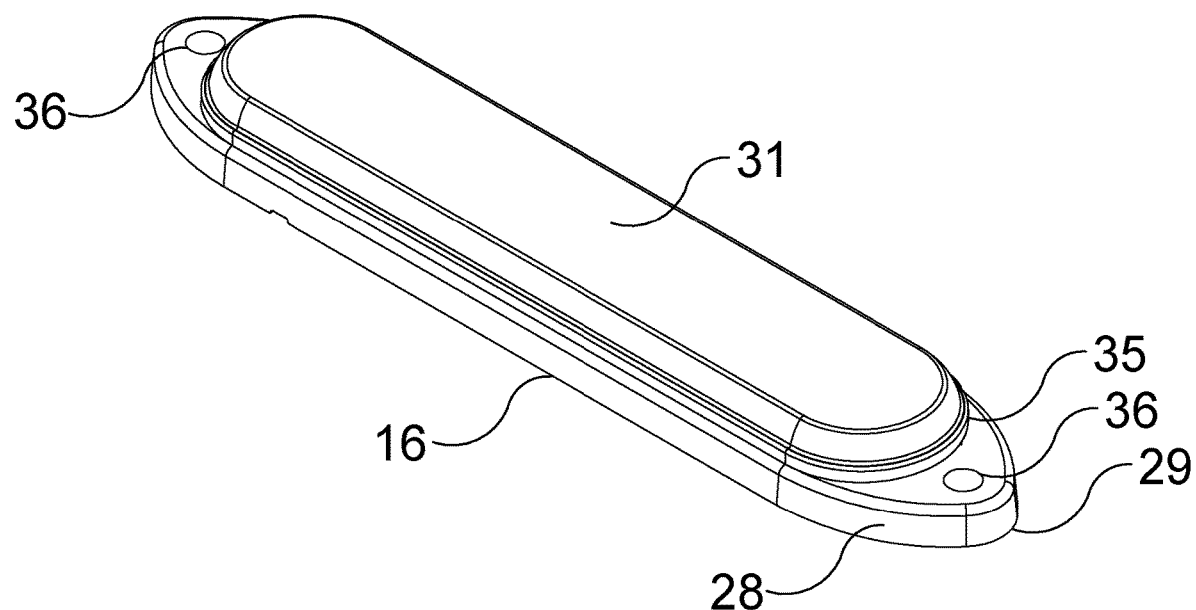

Referring to FIGS. 3 and 3A, an example of warning device 16 is shown having a housing 28 with a base 29 and a front lens 31 which is received along a recessed opening 35 of base 29 to enclose a circuit board 32 in housing 28. For purpose of illustration, the only electronics of FIG. 2 shown mounted on the circuit board 32 are LEDs 18*a-c*, light sensor 17, and controller 20. Wires 33 connected to circuit board 32 include ground and 12/24 VDC lines, and may further include one or more of line 25 and enable lines 26*a-c*. Lens 31 may be of injection molded plastic, colored or clear, and may have features for diffusing light from LEDs 18*a-c* when actuated. Base 29 has a rear opening 34 for wires 33. Base 29 may be made of material, such as aluminum, to dissipate heat from the LEDs through the base into the ambient environment, and/or through the structure upon which the base is surface mounted upon using screws through holes 36.

Figure 4:
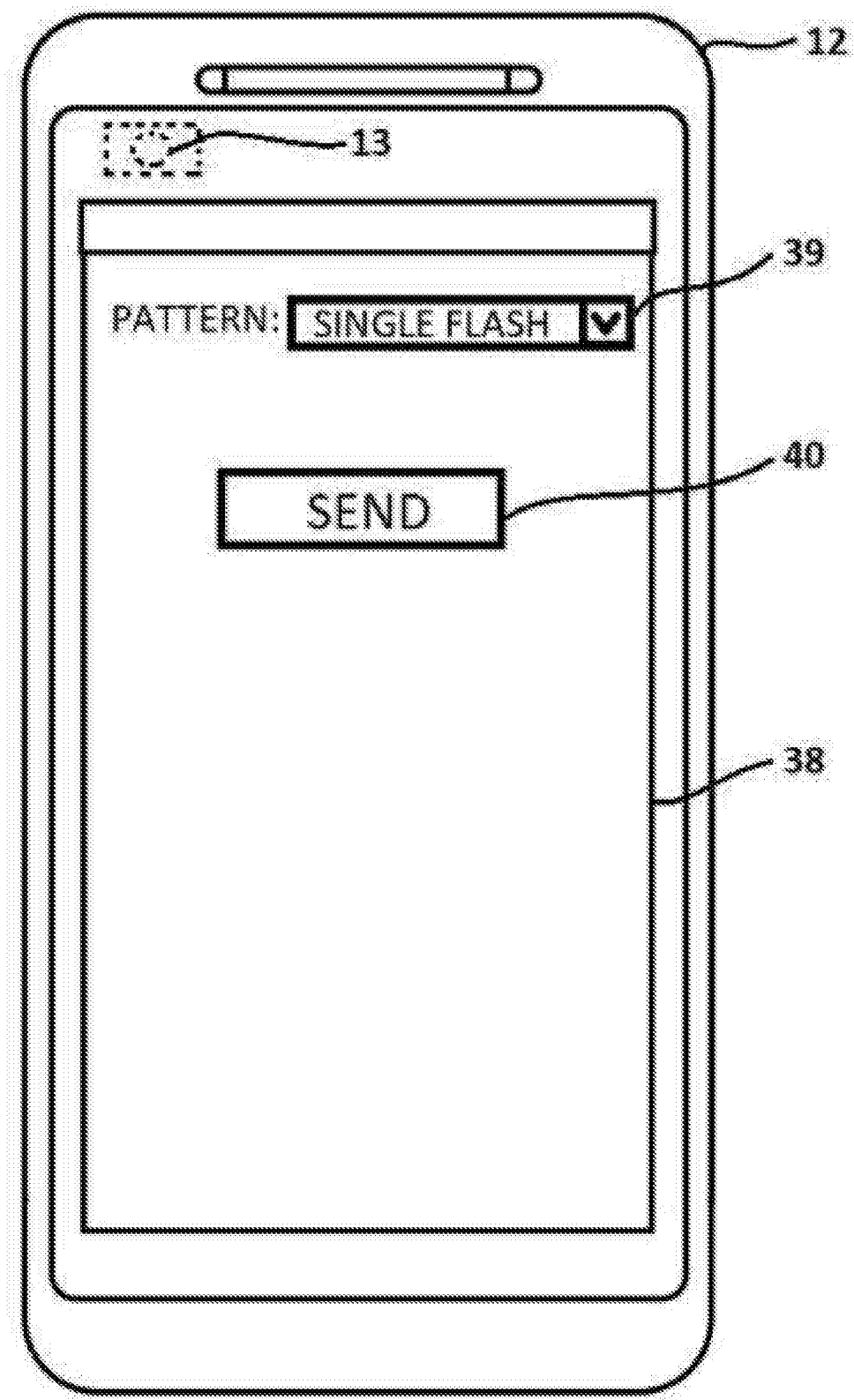
FIG. 4 is a front view of a portable device in the system of FIG. 1 in the example of a smartphone showing a user interface enabling a user to program options for operating the warning device of FIG. 1, where the user interface shown enables selection of a programming option for the warning device using a single drop-down menu.

Referring to FIG. 4, a graphical user interface 38 is shown on a display disposed along the front of a housing of portable device 12 in the case of an example smartphone. The user interface 38 operates in accordance with a program of the software application in memory of portable device 12, where such software application also controls the light emitter 13 as described earlier to provide light pulses 14. In this example, light emitter 13 is provided by the smart phone's flash to provide optical signals in the form of light pulses 14 so as to program options of the warning device 16 in system 10. Light emitter 13, such as a white light LED, is disposed on the opposite surface from user interface 38, i.e., along the back of portable device's housing as indicated by dashed lines. Not shown are other features typical on the smartphone, such as lens associated with camera operation onto an image detector, which is not being utilized in system 10. The user interface 38 may be enabled by a touch screen type display, or on portable device 12 without a touch screen by a movable curser of a typical mouse or trackpad of device 12 enabling selections along the display's screen.

The warning device 12 installer or user selects one or more programming options for operating each of the one or more sources of the warning device 16 using a pull-down menu or buttons 39. While a single programming options having pull-down menu 39 is shown for purposes of illustration, as in the case of a warning device 16 having a single source or selectable parameter of operation of its one or more sources, a pull-down menu 39 may be provided on user interface 38 for each of the programming options for warning device 16. Preferably, each programming option is associated with a different one of the visible and/or audible sources to enable selection for operation of that source in accordance with the software application enabling system 10 in memory of portable device 12 for the warning device to be programmed. For each programming option, a user taps or selects the down arrow in menu 39 to temporarily display a list of patterns, and the user selects one of the patterns which removes the displayed list and solely displays the selected pattern in an input field as shown in FIG. 4 in the example of a "single flash". Selection may be by tapping on one of the patterns listed when user interface is touch screen enabled, moving a curser over and clicking one of the patterns listed, or other manner of enabling selection may be used as typical in a mobile software application with or without being selected from a pull down menu.

Figure 4A:
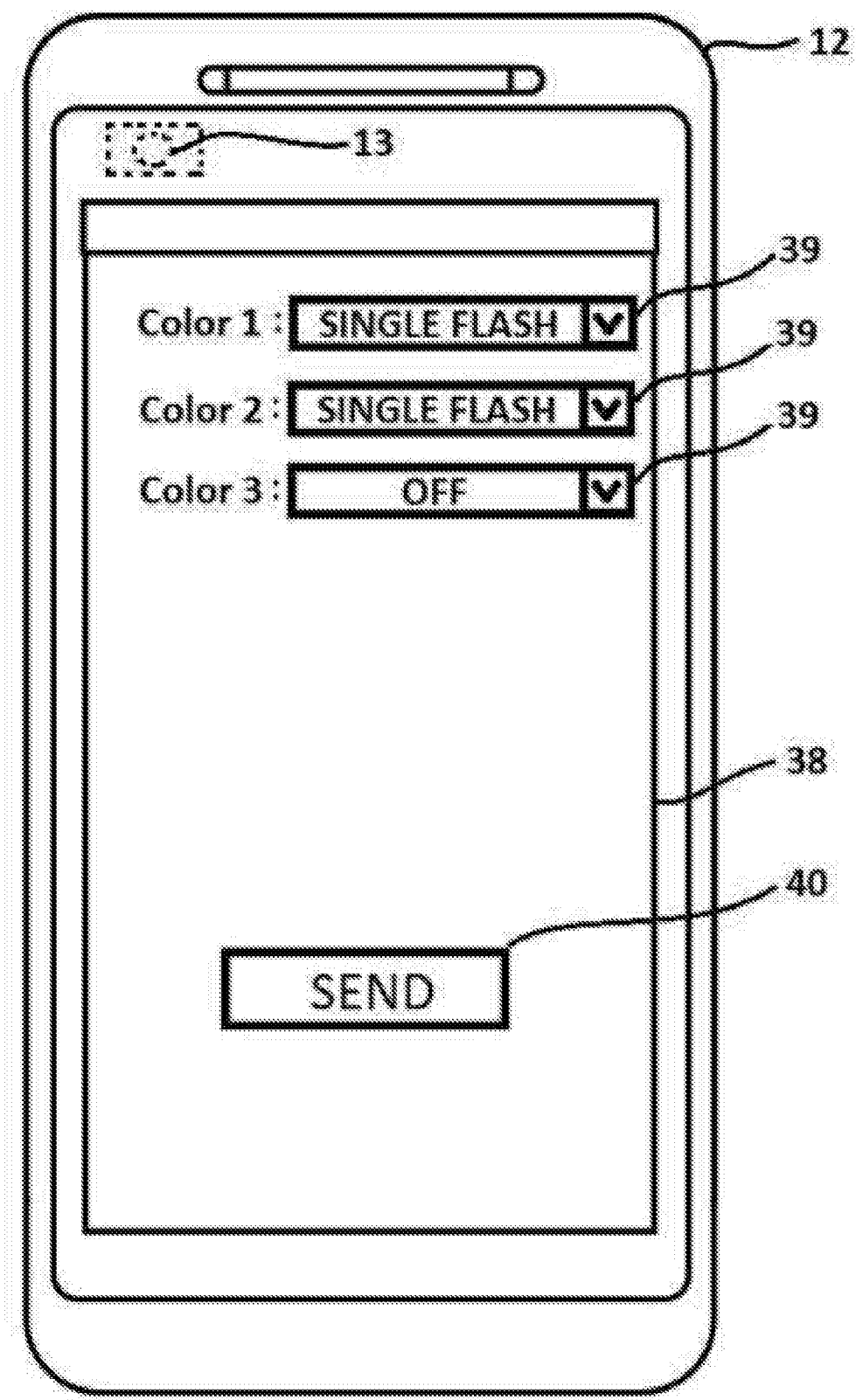
FIG. 4A is the same front view of the portable device of FIG. 4 showing an example of a user interface enabling a user to select programming options for the warning device of FIGS. 3 and 3A having three illumination sources of different colors.

In the case of a warning device 16 providing visual warning signals, each programming option for a source can be different patterns of light, such as single flash, double flash, or triple flash, in which a preset delay (e.g., 0.5 seconds) is provided between each set of one, two, or three flashes, respectively, and may include steady on, and off options. For the warning device 16 of FIGS. 2, 3, and 3A, the user interface 38 as shown in FIG. 4A may be used to enable selection of three programming options or input fields for selecting a pattern for each of LEDs 18*a*, 18*b*, and 18*c* (labelled Color 1, Color 2, and Color 3, respectively) visible warning signals via lens 31. In the particular example shown in FIG. 4A, the option selected for LEDs 18*a* and 18*b* is single flash, and for LED 18*c* is off. One of different patterns may thus be selected for each programming option as desired by the user. The selectable patterns or parameters for each programming option may be the same or different from each other, where each programming option is indicated by its label beside the input field for the option on user interface 38, such as "PATTERN" on FIG. 4, "Color 1, Color 2, and Color 3" in FIG. 4A. The same or other labels may be used in accordance with programming options available for the warning device 16 on user interface 38, such as would have been traditionally set by repeated button pushes or toggling wires to power or ground to program the warning device. A warning device 16 providing audible warning signal in addition to visual warning signals, or only audible warning signals, has similar selectable programming option(s) on user interface 38, but relating to pattern and/or tone of audible warning signals. Thus, the particular option(s) available to be programmed, and selectable patterns or parameters for each option, depends the particular warning device 16. The portable device 12 stores in its memory for each option the associated number of each selectable programming pattern or parameter for that warning device 16 being programmed, and the number of each option once selected by the user on user interface 38.

Once the one or more programming options are selected on user interface 38, the user holds the portable device 12 sufficiently close to the warning device's light sensor 17 so that the light sensor 17 will receive light from the light emitter 13 when activated, and presses a send button 40 along user interface 38. The portable device 12 will then format a stream of binary bits having data for transmission, at least a portion of which corresponds to the number of each selected option, and converts the stream of binary bits into optical signals as visible light pulses 14 using its light emitter 13 in accordance with a communication protocol for transmission in system 10 to the warning device 16. The preferred communication protocol is described below in connection with FIG. 6 and examples of FIG. 7, however other communication protocols may be used. Optionally, a password is utilized to encrypt the data representative of the option(s) by the portable device 12 prior to transmission in light pulses 14, and the controller 20 of warning device 16 decrypts detected data using such password, which is stored in the controller's memory. The software application providing user interface 38 may also be provided on other programmable portable devices, such as a laptop or tablet, or even on a desktop computer which communication with a portable module with light emitter 13 as described earlier, to enable selection of option(s) and transmission of data using optical signals of light pulses 14 to warning device 16.

Figure 5:
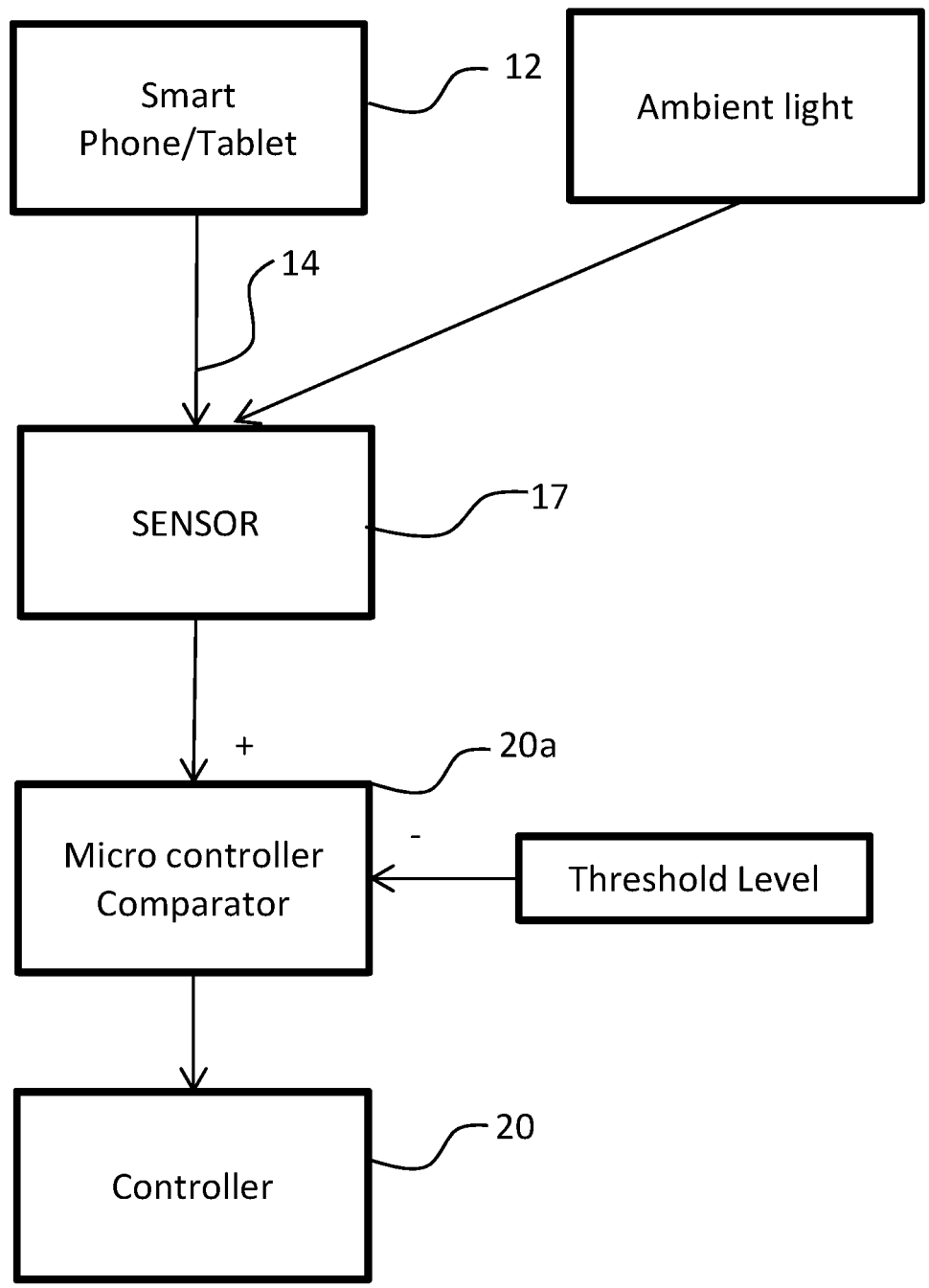
FIG. 5 is an overview of the process of the system of FIG. 1.

Referring to FIG. 5, an overview of the system 10 is shown for transfer and detection of data by warning device 16 using light sensor 17. The portable device 12 sends visible light communication in light pulses 14 to light sensor 17 of the warning device 16 representative of binary bits of data. A comparator 20a within controller 20 compares the analog voltage level representing the optical signals on line 19 (FIG. 2) received from light sensor 17 from light emitter 13 to a threshold level to determine whether and high "1" or low "0" binary value is received for each of a series of bits, which include as part thereof the data corresponding to the option(s) selected by the user via user interface 38. The controller 20 then uses the data received in operating warning device 16 in accordance with such option(s). The controller 20 preferably includes the function of comparator 20a, but comparator 20a may be a separate chip connected to controller 20 with a threshold level configurable by the controller. As depicted in FIG. 5, ambient light will likely be present when optical signals in the form of light pulses 14 are received from portable device 12, and because this, the light from light emitter 13 of the portable device 12 needs to be brighter (e.g., output radiance) than that of the ambient light. As light sensor 17 picks up all visible light (or optionally particular wavelength(s) or wavelength range(s) which the sensor is sensitive to) in sending an analog level representative of such visible light to comparator 20a to trigger a digital one or a zero depending on the threshold level, the threshold level is preferably adjusted to the ambient light conditions to assure reception of the visible light communication from portable device 12 as described below.

Figure 6:
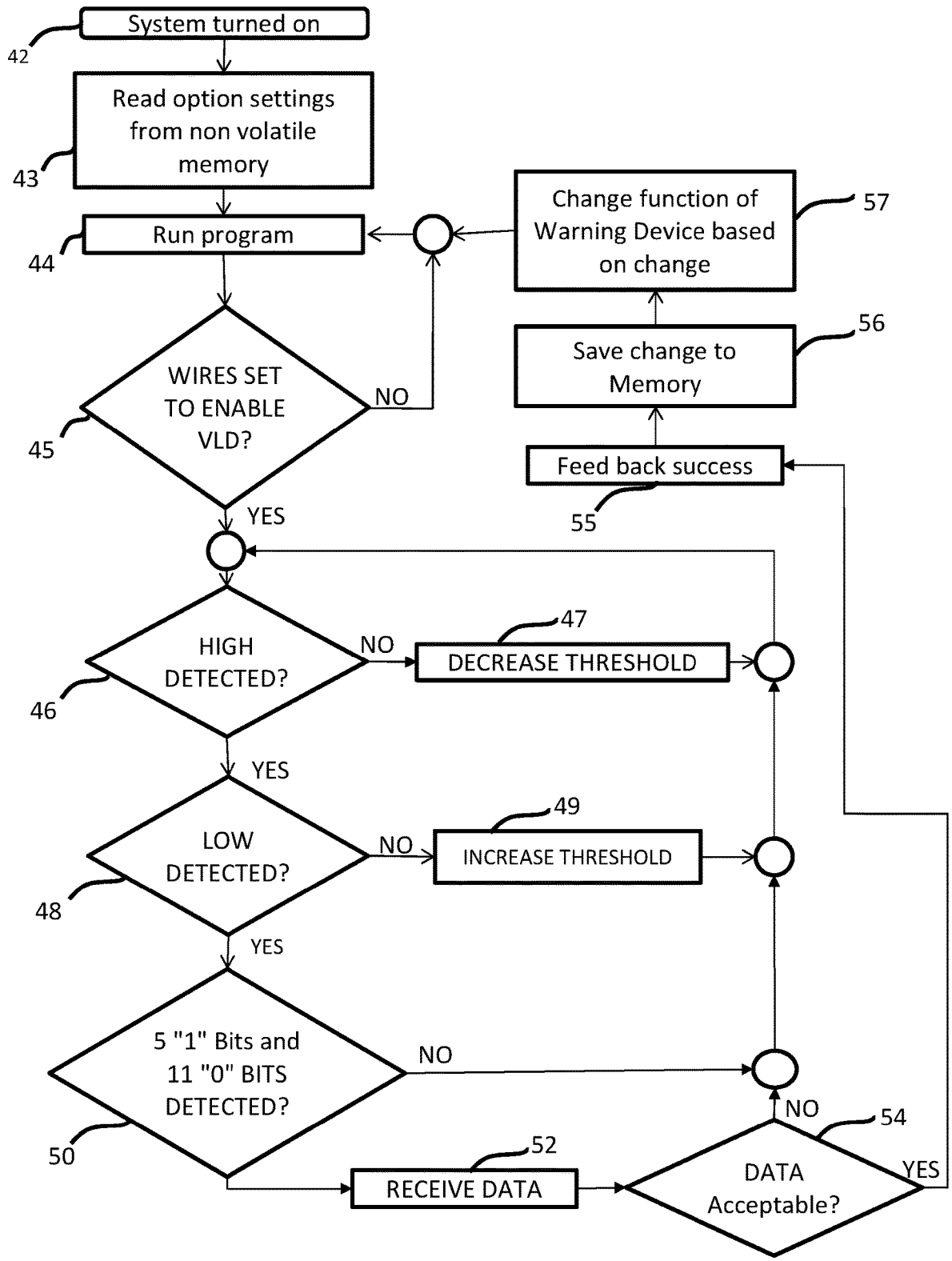
FIG. 6 is a flowchart showing the operation of the warning device in the system of FIG. 1.

Referring to FIG. 6, a flowchart of the preferred operation for enabling the one-way data transfer in system 10 is shown, where such data is referred to in FIG. 6 as visible light data (VLD). At step 42, the system 10 turns on upon applied power to controller 20 from voltage source 24, i.e., when external voltage 12/24 VDC is provided via one of wires 33. This boots up system 10, and at step 43 the controller 20 reads option settings (e.g., patterns) previously selected and stored in its non-volatile memory, and runs the program stored in its memory at step 44 which starts activation of LEDs 18a-c using enable lines 21a-c according to such option settings for those ones of lines 26a-c that are enabled, i.e., set to an external voltage 12/24 VDC. Next at step 45, controller 20 checks if data transfer using light sensor 17 is enabled by line 25 being set to ground or low, thereby unlocking the warning device 16 for data transfer. If not, controller 20 returns to step 44. If data transfer is unlocked, controller 20 starts measuring (or reading) analog voltage levels from light sensor 17 and compares the value to the threshold level at step 46. The controller 20 may measure the voltage levels from the input line 19 connected to the light sensor 17 periodically, such as every 20 milliseconds.

The portable device 12 is placed in proximity of the warning device 16 as shown in FIG. 1, and the user initiates transmission of visible light pulses 14 such as by pressing send button 40 on user interface 38 (FIG. 4 or 4A). Proximity refers to the capability of light emitter 13 being disposed near the warning device 16 in view of its light sensor 17 to sense light pulses 14 from light emitter 13, such as 6 inches or less, and such distance between devices 12 and 16 may vary depending the amount of ambient light present and/or output radiance of light emitter 13. The portable device 12 operates light emitter 13 to send a first group of alternating high and low optical signals in visible light pulses 14, such at 40 millisecond cycles for a period of 0.5 seconds, to allow warning device 16 to adjust the threshold level if needed, and then a second group of optical signals in visible light pulses 14 formatted to contain the selected option(s) for updating the operation of source(s) providing warning signals from the warning device 16. Each optical signal in light pulses 14 transmitted is representative of either an on or high "1" bit pulse, or off or low "0" bit pulse, sent for a predetermined duration by the software application operating the light emitter 13 of portable device 12, where such duration is in accordance with the expected width of a bit to be received by controller 20 along line 19 from light sensor 17. For example, such duration may be 40 milliseconds, but other duration may be used. The preferred communication protocol in system 10 for sending the second group of optical signals as visible light pulses 14 to warning device 16 will be described later in connection with steps 50 and 52.

Figure 8:
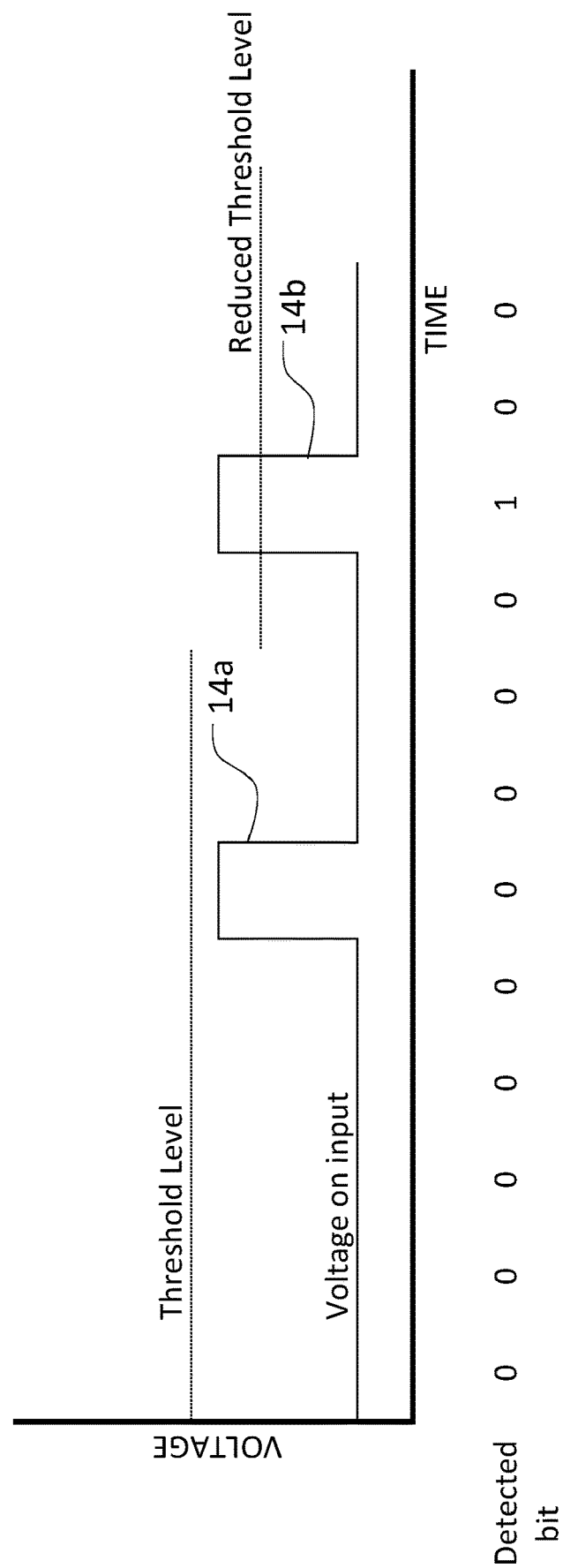
FIG. 8 is a timing diagram illustrating the concept of threshold level adjustment of FIG. 6 responsive to two examples of measured electrical signals associated with light pulses.

At step 46, controller 20 compares the measured analog voltage value representative of light received from light sensor 17 with a start threshold level, if above then a high is detected and the process moves on to step 48. If a high is not detected within a set time frame at step 46, such as 80 milliseconds, controller 20 lowers the threshold level a set decrease amount at step 47 and returns to step 46. This process is repeated until either a high is detected or a minimum threshold level is reached. The concept is shown for example in FIG. 8, where a first light pulse generates a measured analog voltage signal 14a at controller 20 input from light sensor 17 below the threshold level, and the threshold level is then reduced so that a high can be detected by the measured analog voltage signal 14b at controller 20 input from light sensor 17 of a second light pulse, which then exceeds the new threshold level and thus can represent a binary "1" bit. FIG. 8 is illustrative of the threshold adjustment concept, the particular sequence of measured analog voltage signals associated with light pulses are preferably different from that shown in FIG. 8.

If no high is detected at step 46, the threshold level reduces as a result of looping through steps 46 and 47 multiple times until a minimum threshold level is reached, controller 20 then waits until a voltage signal from light sensor 17 is detected at step 46 representing a high. If the controller 20 cannot find an acceptable threshold level at step 46 using the first group of light pulses 14 sent from portable device 12, it will continue searching for an acceptable threshold level at steps 46 and 47 using the second group of light pulses, and the user of the portable device 12 then will have to press again send button 40.

After a high is detected at step 46, controller 20 at step 48 compares the measured analog voltage value of the next sample received representative of light received from light sensor 17 with the last threshold level used at step 46, if at or below then a low is detected and the process moves on to step 50. If a low is not detected with in a set time frame at step 48, such as 80 milliseconds, the controller 20 increases the threshold level a set increase amount at step 49 and returns to step 46. This process is repeated until either a low is detected or a maximum threshold level is reached. For example, the start threshold level may be 120 millivolts, with a set decrease amount at −20 millivolts at step 47, a set increase amount at +20 millivolts at step 49, and minimum and maximum thresholds of 20 millivolts and 4.98 volts, respectively, which are all stored in memory of the controller 20 along with the most current threshold level if and when last adjusted by steps 47 and/or 49. In operation, a sampling timer in controller 20 continuously is used to counts from 0 to half the bit width period, e.g., 20 milliseconds for a 40 millisecond bit width, and then resets back to zero. When the sampling timer expires, the controller 20 measures (or reads) the voltage level detected by light sensor 17 when carrying out step 46 and 48. However, if controller 20 cannot find an acceptable threshold level at step 48 using the first group of light pulses 14 sent from portable device 12, it will continue searching for an acceptable threshold level at step 46-49 using the second group of light pulses, and the user of the portable device 12 then will have to press again send button 40. Thus, the adjustment of threshold level adjusts the sensitivity of data detection by controller 20 to discriminate visible light pulses 14 from ambient light present while accounting for the output radiance from light source 13 falling upon light sensor 17, which can vary with the illumination power of the light source 13 and the distance between light source 13 and light sensor 17, i.e., output radiance of light source 13 reduces upon light sensor 17 as such distance increases, and increases upon light sensor 17 as such distance decreases).

Once a high and a low samples are sequentially detected at steps 46 and 48, controller 20 using the last threshold level used at step 48 checks at step 50 for detection of five high "1" bits (start bits) followed by a null start frame consisting of 11 low "0" bit pulses, indicative receipt of the first 16 bits of data representative of the second group of light pulses 14 from portable device 12. If the start frame is successfully received, then controller 20 at step 52 continues to detect and store bit values of data representative of the second group of light pulses 14 in accordance with the last threshold level used at step 48, i.e., by comparing for each expected bit the measured analog value representative of light sensed from light sensor 17 which if above the threshold level is a high or "1" bit is received, and if at or below the threshold level a "0" bit is received. It has been found that once a threshold level determined, it provides proper resolution discriminating high "1" and low "0" bits from measured light pulses 14 in accordance with voltage values from light sensor 17.

Referring to FIG. 7, two examples of data converted to provide the second group of light pulses 14 by portable device 12 are shown formatted for detection by controller 20 with error detection and clock synchronization bits. Each bit is given a fixed time either on or off, a "1" represents the light as on and a "0" as off. Time progresses from left to right sequentially. So at step 50, the first five start bits high are sent so that the controller 20 can get ready for data, followed by one entire null data set of eleven low "0" bits to signify the start of the data transmission of the option(s) selected via user interface 38. After the eleven low "0" bits of null data set of the start frame is detected, a low start bit "$S_L$", a high start bit "$S_H$", a "P" parity bit, and eight bits of payload data are provided for each option being programmed (step 52). The parity bit is set to one if the next eight bits equals an odd number, and zero if the next eight bits equals an even number. This sequence is repeated in this example four times, once with a null data set of eight "0" bit and then for each option associated with LEDS 18a-c, but could be repeated with one or any number of data sets for desired programming of warning device 16 depending the number of programming option(s) selectable on user interface 38. In the case of the warning device with LEDs 18a-c, the number of datasets after the null data set depends on the number of enable lines 21a-c being driven by controller 20 of the warning device. The last byte is a Cyclic Redundancy Check (CRC) which provide error detection. The CRC is an eight bit number equal to the value of the total number of bits representing data for each of the patterns to confirm that the data sent was correct. Follow the CRC, a high "1" end bit indicating to controller 20 the end of reception of the data representative of optical signals of the second group of light pulses 14.

In example 1 of FIG. 7, the received data at step 52 provides pattern number 1 for driving LED 18a, pattern number 7 for driving LED 18b, and pattern number 5 for driving LED 18c, and the total number of bits is 13 in the CRC field. In example 2 of FIG. 7, the received data at step 52 provides pattern number 0 for driving LED 18a, pattern number 9 for driving LED 18b, and pattern number 18 for driving LED 18c, and total number of bits is 27 in the CRC field. In these examples, multiple selectable patterns are available each having a number, such as from 1 to 18, which are used by controller 20 to determine timing parameters for driving enable lines 21a-c. As stated earlier, a lookup table in memory of controller 20 may be provided which associates each pattern number to its particular timing parameters for driving enable lines. While the examples are illustrated in the case of LEDs 18a-c, a single or other number of programmable options than three may be similarly communicated to warning device 16 in system 10 depending on the number of programmable option(s) available, as selectable using input field(s) available on user interface 38, for wirelessly programming warning device operation.

Since the portable device 12 may be running multiple applications that can cause variations in timing, the combination of a $S_L$ and $S_H$ allows controller 20 to synchronize data detection by realigning its clock to the light pulses 14 received by light sensor 17 and detected by the controller every eleven bits. Such synchronization operation before each set of data bits are detected may be performed as follow. After the null data set is detected, controller 20 reads and compares analog voltage signal from light sensor 17 to the threshold level multiple time over short intervals, such as every 1 to 2 microseconds, until controller 20 determines that the $S_L$ bit changes from low to the high $S_H$ bit. At the time of detection of this change, the controller 20 reset its sampling timer to zero, so sampling at half the bit width of read analog signal from light sensor 17 is expected to be in the middle of the optical signal representative of the parity bit when detected. Thereafter, analog voltage signals are then read by the controller 20 from the light sensor 17 every bit width, e.g., 40 milliseconds, using the sampling timer, and compared to the threshold level to obtain their binary bit values, which should occur at or near the middle of each measured optical signal for the next eight bits of data representing a selected option for the warning device 16. This synchronization for sampling the analog voltage signal from the light sensor 17 occurs for every pair of $S_L$ and $S_H$ bits after a data is read until the CRC field. While the data structure shown in FIG. 7 is preferred, other communication protocols may be used without $S_L$ and $S_H$, and/or parity bits.

Returning back to FIG. 6, at step 54 controller 20 determines whether the stream of data bits received at step 52 is acceptable by checking that the total length of the data stream equals the number of bits expected (i.e., 62 in each example of FIG. 7), that the parity bit for each data set is proper, and that the CRC number is correct. If any one of these checks is not met, then data received and stored temporally in memory of controller 20 at step 52 is discarded, and the process then returns to step 46. If no errors are detected at step 54, then a feedback success indicator is made at step 55 by controller 20 flashing one or more, or all, LEDs 18a-c twice, or other number of times. This is to notify the user of reception of the selected programming option(s) for the warning device 16. Using the data structure of the communication protocol in system 10 of the data detected representative of optical signals of the second group of light pulses 14, controller 20 parses from the data detected to read the portion thereof representing each of the programming options for warning device 16. The number associated with the binary value of the eight bits of each programming option is read from the data received at step 52 and stored in memory of the controller 20 as updated option settings (step 56), and then function of the warning device 16 is changed accordingly by the controller 20 to provide the selected patterns for those LED 18a-c enabled by lines 26a-c (step 57).

Similarly, controller 20 in a warning device 16 capable of providing audible warning signals operates with a light sensor 17 with a portable device 12 in the same manner in system 10 as described above to change the function of a source for audible warning signals. Such warning device 16 capable of providing audible (or acoustic) signals may be a backup alarm, as shown in FIG. 9, or described in U.S. Pat. No. 8,669,852, or a programmable Star Spectrum™ or Star Alarm® model manufactured by Star Headlight and Lantern Co., of Avon, N.Y., which is adapted to having its controller (microcontroller or microprocessor) of audible source(s), e.g., speaker, programmed to operate similar to that of controller 20 (FIGS. 5 and 6) in system 10 to detected data using light sensor 17 (which may be mounted upon the alarm's circuit board in view of an opening along the housing of the alarm to sense light pulses 14) when a line 25 to the controller is enabled to allow such wireless programming.

As described above, the present invention provides wireless communication of data from a portable device, such as a smartphone or tablet, to a visible or audible warning device as may be mounted on a vehicle, which is a smaller in terms of circuit board area and more cost-effective solution than using other types of wireless communication, such as Bluetooth or Wi-Fi. Consider for example a Bluetooth module model no. BGM113A256V2R from Silicon Labs, which currently is around US$5.20, and takes up around 0.250 inches square on a circuit board, which is more expensive and takes up more area than a light sensor in the warning device, such as a Vishay TEMT7000x01 photo sensor, which currently costs US$0.30 and only occupies 0.004 inches square on a circuit board.

While the wireless communication is shown and described for warning devices 16, any programmable device may be provided with a light sensor 17 to enable data detection of light pulses 14 as described above and similarly programmed in accordance with one or more options selectable via a user interface of the portable device 12 to update its function(s). Thus, wireless communication described herein may be adapted for use in other electronic devices having programmable option(s), where surface mount warning light of FIGS. 3 and 3A and backup warning alarm of FIG. 9 are examples.

From the foregoing description, it will be apparent that there has been provided a system and method for visible light communication with a warning device. Variations and modifications within the scope of the invention will undoubtedly suggest themselves to those skilled in the art. Accordingly, the foregoing description should be taken as illustrative and not in a limiting sense.

The invention claimed is:

1. A system for visible light communication with a warning device for programming operation thereof, said system comprising:
   a portable device with a visible light source operated to emit optical signals as light pulses representative of data;
   a warning device having one or more sources providing one or more of visible or audible warning signals; and
   said warning device having a controller, and a light sensor providing electrical signals to said controller representative of said light pulses sensed by said light sensor, in which said controller detects said data using said electrical signals received from said light sensor, and programs operation of said one or more sources of said warning device responsive to at least a portion of said data detected representative of one or more selected parameters of operation of said warning device, so that said one or more sources function in accordance with said one or more selected parameters when said warning device is operated.

2. The system according to claim 1 wherein each of said one or more selected parameters represents one of a plurality of different parameters of an option setting for programming operation of at least one of said one or more sources of the warning device.

3. The system according to claim 1 wherein said portable device has a user interface enabling selection of each of said one or more selected parameters from a plurality of different parameters of an option setting for programming operation of said warning device.

4. The system according to claim 2 wherein said warning device represents one of a plurality of different warning devices each with same or different ones of said option setting.

5. The system according to claim 1 wherein said portable device is a smartphone or tablet having a built-in flash providing said light source.

6. The system according to claim 1 wherein only one-way communication from said portable device to said warning device is enabled by said light pulses emitted from said light source to said light sensor.

7. The system according to claim 1 wherein said light pulses emitted from said light source to said light sensor being representative of a stream of bits providing said data, each of said bits being a 1 or 0 value associated with presence or absence, respectively, of each of said light pulses when sensed by said light sensor and detected by said controller in accordance with said electrical signals from said light sensor.

8. The system according to claim 1 wherein said light pulses emitted from said light source to said light sensor being representative of a stream of bits providing said data each having a 1 or 0 value associated with presence or absence, respectively, of each of said light pulses when sensed by said light sensor, and each of said bits of said data being detected by said controller by comparing a measured value of said electrical signals from said light sensor associated with the bit with a threshold level.

9. The system according to claim 8 wherein said light pulses represent a first group and a second group of light pulses, in which said second group is representative of at least said data, wherein said first group is emitted prior to said second group, and said first group is provided by said light source to enable any adjustment of said threshold level by said controller responsive to electrical signals from said light sensor sensing said first group of light pulses to account for at least ambient light present.

10. The system according to claim 1 wherein said light pulses representative of said data comprises said portion said controller operates said one or more sources responsive to, and other data for synchronization of detection of said data and error detection by said controller when said data is detected.

11. The system according to claim 1 wherein said one or more sources of said warning device comprise one or more illumination sources providing visible warning signals, and said one or more selected parameters enables at least selection of a pattern of light from each of said one or more illumination sources.

12. The system according to claim 11 wherein said one or more sources represents one of one or more illumination sources of a common color, and a plurality of said illumination sources each of a different color.

13. The system according to claim 1 wherein said one or more sources of said warning device comprise a speaker providing audible warning signals, and said one or more selected parameters enables at least selection of a pattern of sound or tone emitted from said speaker.

14. The system according to claim 1 wherein said warning device comprises an input to said controller selectable between one of being enabled to allow said controller to receive said data using said electrical signals from said light sensor, and disabled to prevent said controller from operating responsive to said data to program operation of said one or more sources.

15. A method for visible light communication with a warning device for programming operation thereof, said method comprising steps of:
   operating a visible light source of a portable device to emit optical signals as light pulses representative of data;
   detecting said data representative of said light pulses using a light sensor of a warning device; and
   programming one or more sources of the warning device to provide one or more of visible or audible warning signals responsive to at least a portion of said data detected representative of one or more selected parameters of operation of said warning device; and
   operating said one or more sources in accordance with said one or more selected parameters.

16. The method according to claim 15 further comprising the step of adjusting sensitivity of said data detecting step to discriminate said light pulses from ambient light.

17. A visible or audible warning device comprising
   one or more sources providing one or more of visible or audible warning signals;
   a controller; and
   a light sensor providing electrical signals to said controller representative of light pulses sensed by said light sensor, in which said controller detects data using said electrical signals received from said light sensor, and programs operation of said one or more sources responsive to at least a portion of said data representative of any changes from at least one current pattern or mode of operation of said one or more sources.

18. The device according to claim 17 wherein said light pulses are representative of a stream of bits providing said data each having a digital 1 or 0 value associated with presence or absence, respectively, of each of said light pulses when sensed by said light sensor, and each of said bits of data being detected by said controller by comparing for each of said bits a measured value of said electrical signals from said light sensor with a threshold level.

19. A portable device for wireless communication using a visible light source comprising:
   a portable housing having a first surface with a display, and a user interface along said display for selecting one or more options for programming operation of one or more sources providing one or more of visible or audible warning signals from a warning device; and
   a visible light source along a second surface opposing said first surface which is operated to emit optical signals as light pulses representative of data in which at least a portion of said data represents said one or more options for use by the warning device in programming operation of said one or more sources.

20. The system according to claim 1 wherein said warning device comprises memory which stores a setting in accordance with each of said one or more selected parameters for operating said one or more sources of said warning device, and said controller, responsive to said data being detected, updates said setting in said memory in accordance with said one or more selected parameters from said data in order to change the operation of said one or more sources of said warning device.

21. The system according to claim 1 wherein said warning device comprises a housing having said one or more sources, said controller, and said light sensor, in which said light sensor is disposed to receive light pulses from said visible light source.

22. The system according to claim 1 wherein said warning device is mountable to a vehicle, and at least one of said one or more sources outputs said warning signals from the vehicle in one of a plurality of patterns or modes in accordance with said one or more selected parameters when said warning device is operated.

23. The system according to claim 22 wherein said one or more sources are a plurality of illumination sources each providing light of a different color from each other.

24. The system according to claim 23 wherein each one of said illumination sources represents one or more LEDs of a same color.

25. The system according to claim 22 wherein said one or more sources provide light of a same color.

26. A system for visible light communication with a warning device, said system comprising:
   a portable device with a visible light source operated to emit optical signals as light pulses representative of data; and
   a warning device mountable onto a vehicle comprising one or more light sources providing visible warning signals, a controller, and a light sensor providing electrical signals to said controller representative of said light pulses, wherein said warning device outputs warning signals from the vehicle in accordance with one of a plurality of different patterns or modes, and said controller detects said data using said electrical signals received from said light sensor, and operates said one or more sources of said warning device responsive to at least a portion of said data detected representative of any changes in said one of plurality of patterns or modes to another one of said plurality of different patterns or modes for said at least one of said one or more light sources, wherein said warning device further comprises a housing having a circuit board supporting at least said controller and said one or more light sources, said light sensor being disposed in said housing to receive said light pulses from said visible light source, and said one or more light sources being disposed to output said warning signals via a lens of said housing when said warning device is operated.

* * * * *